United States Patent
Chirol et al.

(10) Patent No.: US 12,129,884 B2
(45) Date of Patent: Oct. 29, 2024

(54) SCORED SPACER ELEMENT SERVING TO OBTAIN A SPACER WASHER POSITIONED BETWEEN PARTS OF AN ASSEMBLY, AND METHOD FOR ASSEMBLING AT LEAST TWO PARTS USING AT LEAST ONE SUCH SCORED SPACER ELEMENT

(71) Applicant: Airbus Operations SAS, Toulouse (FR)

(72) Inventors: Clément Chirol, Toulouse (FR); Audrey Benaben, Toulouse (FR); Guillaume Pichon, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 150 days.

(21) Appl. No.: 17/939,001

(22) Filed: Sep. 7, 2022

(65) Prior Publication Data

US 2023/0082125 A1 Mar. 16, 2023

(30) Foreign Application Priority Data

Sep. 13, 2021 (FR) ...................................... 2109583

(51) Int. Cl.
- *F16B 43/02* (2006.01)
- *F16B 5/02* (2006.01)
- *F16B 43/00* (2006.01)

(52) U.S. Cl.
CPC ............ *F16B 43/001* (2013.01); *F16B 5/025* (2013.01)

(58) Field of Classification Search
CPC ......... B21D 33/02; F16B 5/025; F16B 43/001
USPC .................................................. 411/546, 542
See application file for complete search history.

(56) References Cited

U.S. PATENT DOCUMENTS

| 2,439,306 A | * | 4/1948 | Laidley | F16B 43/001 |
| | | | | 277/637 |
| 2,439,516 A | * | 4/1948 | Holcomb | F16B 43/001 |
| | | | | 411/533 |
| 2,746,065 A | * | 5/1956 | Poupitch | B21D 53/20 |
| | | | | 470/48 |

(Continued)

FOREIGN PATENT DOCUMENTS

| DE | 2418598 A1 | 10/1975 |
| DE | 3244167 A1 | 5/1984 |

(Continued)

OTHER PUBLICATIONS

French Search Report; priority document.

*Primary Examiner* — Gary W Estremsky
(74) *Attorney, Agent, or Firm* — Greer, Burns & Crain, Ltd.

(57) ABSTRACT

A spacer element serving to obtain a spacer washer positioned between first and second parts of an assembly. The spacer element includes a body having the same geometry as the spacer washer that is to be obtained and a circular score line whose diameter is equal to the internal diameter of the spacer washer that is to be obtained, this score line being configured to break upon insertion of a shank of a connection element, and a centering pad configured to center the score line with respect to the through-orifices of the first and second parts that are configured to accommodate the shank of a connection element when the centering pad is inserted into one of the through-orifices.

8 Claims, 2 Drawing Sheets

(56) References Cited

U.S. PATENT DOCUMENTS

| | | | | | |
|---|---|---|---|---|---|
| 2,927,495 | A | * | 3/1960 | Barwood | F16B 39/34 |
| | | | | | 411/371.1 |
| 3,202,033 | A | * | 8/1965 | Weidner, Jr. | F16B 43/001 |
| | | | | | 411/371.1 |
| 4,887,948 | A | * | 12/1989 | Calmettes | F16B 31/028 |
| | | | | | 411/10 |
| 6,109,848 | A | * | 8/2000 | Werner | F16B 43/001 |
| | | | | | 411/432 |
| 7,827,758 | B1 | * | 11/2010 | Bauer | E04B 1/66 |
| | | | | | 52/366 |
| 8,931,989 | B2 | * | 1/2015 | Stephan | F16J 15/14 |
| | | | | | 411/371.1 |
| 11,674,544 | B2 | * | 6/2023 | Colyn | E04D 5/145 |
| | | | | | 29/525.02 |
| 2006/0239797 | A1 | * | 10/2006 | Evanbar | F16B 43/001 |
| | | | | | 411/542 |
| 2008/0009355 | A1 | * | 1/2008 | Lin | B21D 37/08 |
| | | | | | 470/41 |
| 2014/0068930 | A1 | * | 3/2014 | Strizki | H01R 4/34 |
| | | | | | 411/542 |

FOREIGN PATENT DOCUMENTS

| | | | |
|---|---|---|---|
| GB | 1269924 | A | 4/1972 |
| JP | 4163772 | B2 | 10/2008 |

* cited by examiner

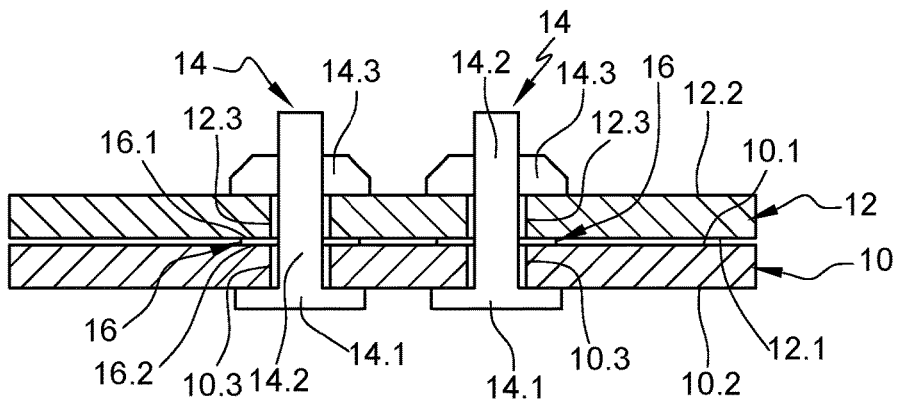
Fig. 1
Prior Art
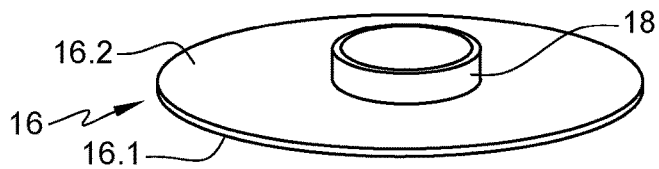
Fig. 2
Prior Art
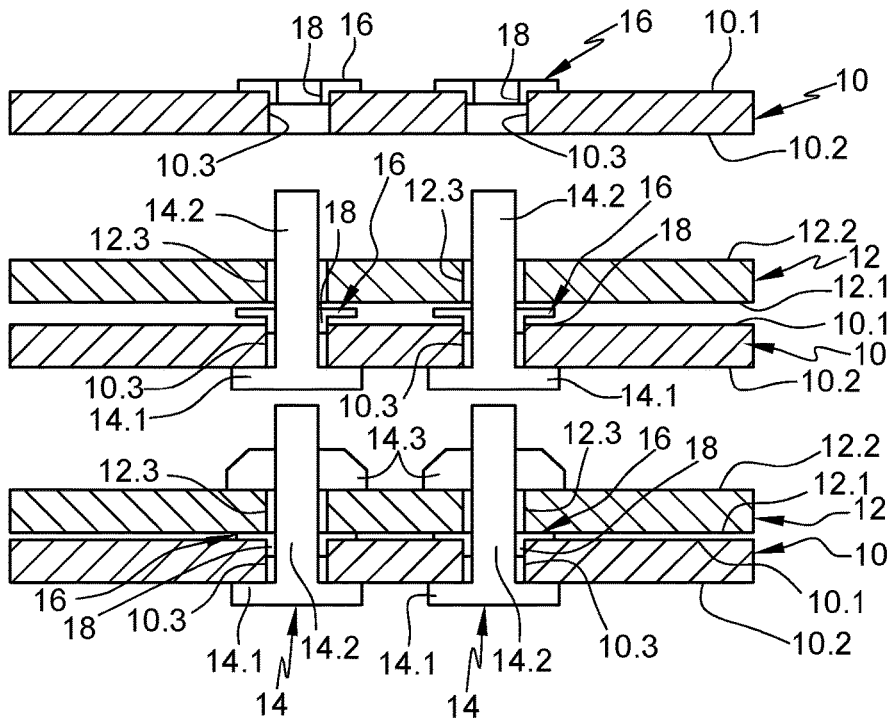
Fig. 3A
Prior Art
Fig. 3B
Prior Art
Fig. 3C
Prior Art
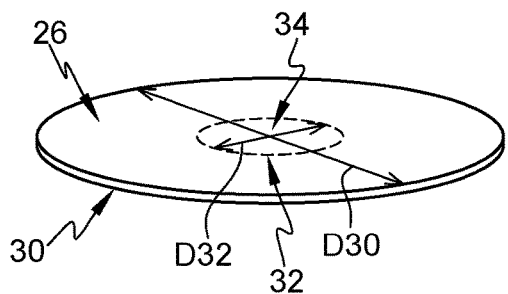
Fig. 4
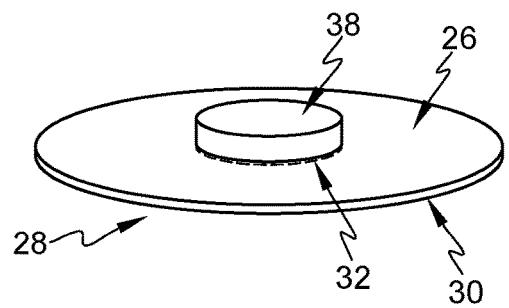
Fig. 5

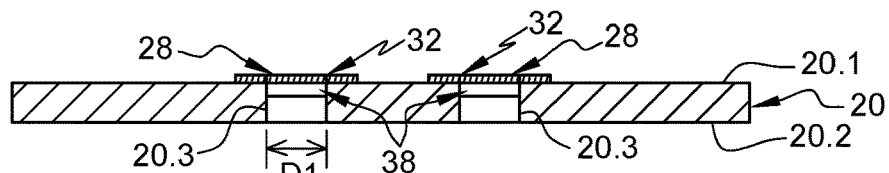
Fig. 6A
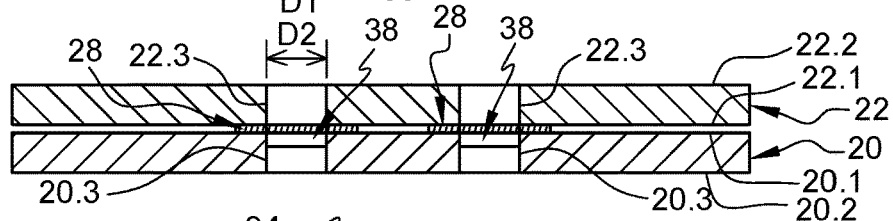
Fig. 6B
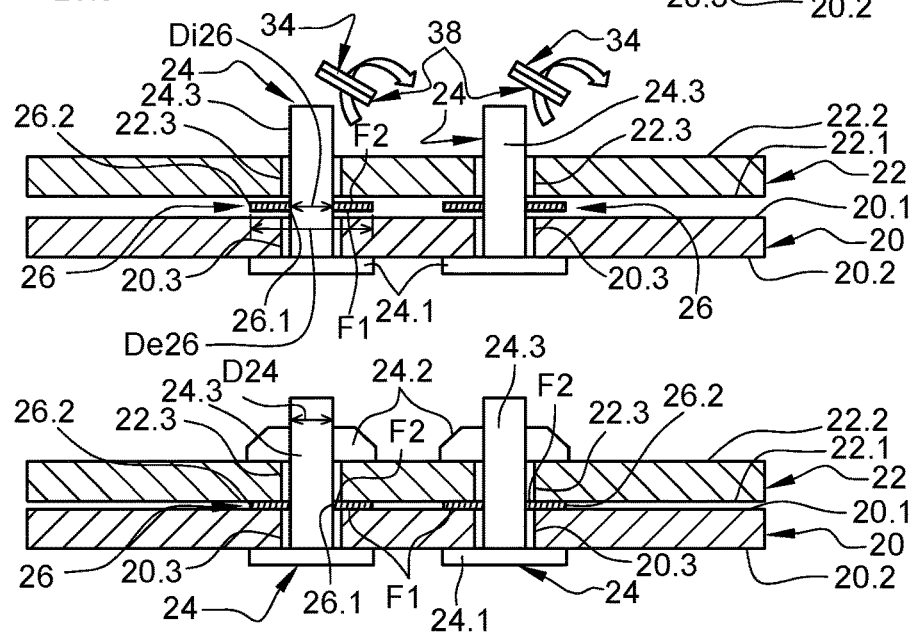
Fig. 6C
Fig. 6D
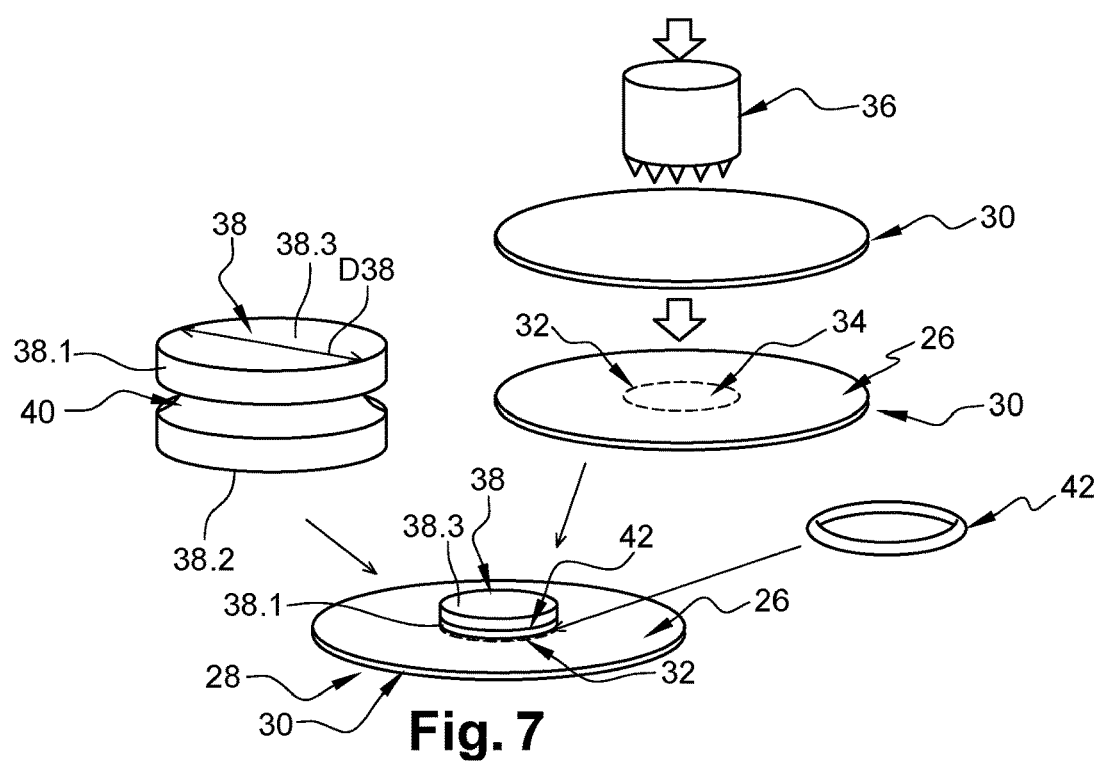
Fig. 7

SCORED SPACER ELEMENT SERVING TO OBTAIN A SPACER WASHER POSITIONED BETWEEN PARTS OF AN ASSEMBLY, AND METHOD FOR ASSEMBLING AT LEAST TWO PARTS USING AT LEAST ONE SUCH SCORED SPACER ELEMENT

CROSS-REFERENCES TO RELATED APPLICATIONS

This application claims the benefit of the French patent application No. 2109583 filed on Sep. 13, 2021, the entire disclosures of which are incorporated herein by way of reference.

FIELD OF THE INVENTION

The present application relates to a scored spacer element serving to obtain a spacer washer positioned between parts of an assembly, and to a method for assembling at least two parts using at least one such scored spacer element.

BACKGROUND OF THE INVENTION

According to one embodiment, shown in FIG. 1, an assembly comprises at least two parts 10, 12 held assembled by at least one bolt 14. The first part 10 comprises a first face 10.1 oriented towards the second part 12, a second face 10.2 opposite the first face 10.1 and a through-orifice 10.3, one for each bolt 14, that opens onto the first and second faces 10.1, 10.2. The second part 12 comprises a first face 12.1 oriented towards the first part 10, a second face 12.2 opposite the first face 12.1 and a through-orifice 12.3, one for each bolt 14, that opens onto the first and second faces 12.1, 12.2. The bolt 14 comprises a screw having a head 14.1 that is pressed against the second face 10.2 of the first part 10 and a threaded shank 14.2 accommodated in the through-orifices 10.3, 12.3 of the first and second parts 10, 12, and a nut 14.3 screwed onto the threaded shank 14.2 and pressed against the second face 12.2 of the second part 12.

According to one designation, the assembly comprises, for each bolt 14, a spacer washer 16 positioned between the first and second parts 10, 12 and around the threaded shank 14.2 of the bolt 14. This spacer washer 16 comprises faces 16.1, 16.2 having high coefficients of friction.

This spacer washer 16 makes it possible to improve the mechanical characteristics of the assembly, in particular in terms of shear strength.

According to a first mode of operation, the threaded shanks 14.2 of the various bolts 14 are inserted into the through-orifices 10.3 of the first part 10, then the spacer washers 16 are threaded onto the threaded shanks 14.2. Next, the second part 12 is put into place, then the nuts 14.3 of the various bolts 14 are tightened. This mode of operation is unsuitable when the parts 10 and 12 that are to be assembled are large and when they must be positioned relative to one another prior to insertion of the threaded shank's 14.2.

According to one embodiment, shown in FIG. 2, a spacer washer 16 comprises a centering ring 18. The spacer washer 16 and the centering ring 18 are secured to one another and the centering ring 18 has an external diameter substantially equal to that of the through-orifice 10.3 of the first part 10.

According to a second mode of operation, shown in FIGS. 3A-3C, a spacer washer 16 is positioned at each through-orifice 10.3 of the first part 10 by inserting the centering ring 18 into the through-orifice 10.3, as illustrated in FIG. 3A.

Next, the first and second parts 10, 12 are positioned with respect to one another by making the through-orifices 10.3 of the first part 10 line up with those of the second part 12, then the threaded shanks 14.2 of the bolts 14 are inserted into the through-holes 10.3, 12.3 of the first and second parts 10, 12, as illustrated in FIG. 3B. Finally, the nuts 14.3 of the various bolts 14 are tightened, as illustrated in FIG. 3C.

Although the centering ring 18 allows each spacer washer 16 to remain positioned in line with the through-orifices 10.3, 12.3 prior to placing of the threaded shank's 14.2, this mode of operation is not satisfactory as the centering rings 18 can interfere with the threaded shanks 14.2 and make placement of the latter difficult.

The present invention aims to remedy all or part of the drawbacks of the prior art.

SUMMARY OF THE INVENTION

To that end, the invention relates to a spacer element by means of which it is possible to obtain a spacer washer comprising first and second faces, a thickness, a perimeter and a through-hole having an internal diameter, the spacer washer being designed to be positioned between a first part and a second part of an assembly, the first and second parts comprising through-orifices having internal diameters designed to accommodate a shank of a connection element.

According to the invention, the spacer element comprises:
- a body having first and second faces corresponding to the first and second faces of the spacer washer that is to be obtained, a thickness and a perimeter that are identical to those of the spacer washer that is to be obtained, a circular score line whose diameter is equal to the internal diameter of the spacer washer that is to be obtained,
- a centering pad positioned on either the first or second face of the body, being secured to the body and centered with respect to the score line, the centering pad being designed to center the score line with respect to the through-orifices of the first and second parts when the centering pad is inserted into one of the through-orifices,
- the score line being designed to break when the shank of a connection element is inserted into the through-orifices of the first and second parts in one of which the centering pad is positioned.

By virtue of the centering pad, the spacer element remains correctly positioned during positioning of the parts of the assembly.

Owing to the fact that the score line breaks upon insertion of the shank of a connection element, no non-detachable element, such as a centering ring of a spacer washer of the prior art, interferes with the shank during insertion thereof, which facilitates the placing of the connection elements.

According to another feature, the centering pad and the body are connected by a non-permanent connection, allowing the centering pad to be detached from a disk of the body when the score line is broken.

According to another feature, the centering pad and the body are connected by a permanent connection.

According to another feature, the centering pad is cylindrical and has an external diameter equal to the internal diameter of the through-orifice in which the centering pad is to be positioned.

According to another feature, the centering pad is cylindrical and has an external diameter smaller than the internal diameter of the through-orifice in which the centering pad is to be positioned. In addition, the spacer element comprises an elastic ring having an internal diameter smaller than the external diameter of the centering pad and an external diameter equal to or slightly greater than the internal diameter of the through-orifice in which the centering pad is to be positioned, the elastic ring being positioned around the centering pad and designed to be able to be compressed between the centering pad and the through-orifice in which the centering pad is to be positioned.

According to another feature, the centering pad has a cylindrical lateral wall, two end faces of which one is pressed against one of the faces of the body, and a peripheral channel provided on the lateral wall, spaced apart from the end faces and designed to accommodate the elastic ring.

According to another feature, the score line comprises a succession of cuts passing through the body.

The invention also relates to a method for assembling at least two parts that are held assembled by at least one connection element, the connection element comprising a first and a second abutment and a shank connecting the first and second abutment, the parts to be assembled each comprising, for each connection element, a through-orifice designed to accommodate the shank of the connection element, wherein the method comprises:

- a step of positioning at least one spacer element as claimed in one of the preceding features, by inserting and centering its centering pad into one of the through-orifices that are intended to receive a connection element,
- a step of positioning the parts that are to be assembled, the body of each spacer element being positioned between the parts,
- a step of inserting the shank of a connection element into the through-orifice in which the centering pad of the spacer element is positioned, during which step the score line breaks, allowing the shank to pass through the parts, a portion of the spacer element being retained between the parts and forming a spacer washer,
- a step of tightening each connection element.

BRIEF DESCRIPTION OF THE DRAWINGS

Other features and advantages will emerge from the following description of the invention, which description is provided purely by way of example and with reference to the appended drawings, in which:

FIG. 1 is a section through an assembly of at least two parts,

FIG. 2 is a perspective view of a spacer washer, illustrating an embodiment of the prior art, FIGS. 3A-3C depict sections illustrating various steps of a method for assembling two parts using spacer washers such as that illustrated in FIG. 2, FIG. 4 is a perspective view of a body of a scored spacer element, illustrating one embodiment of the invention, FIG. 5 is a perspective view of a scored spacer element, illustrating one embodiment of the invention, FIGS. 6A-6D depict sections illustrating various steps of a method for assembling two parts using scored spacer elements such as that illustrated in FIG. 5, and FIG. 7 is a perspective view of a scored spacer element and of its various portions, illustrating one embodiment of the invention.

DETAILED DESCRIPTION OF THE PREFERRED EMBODIMENTS

According to one embodiment, shown in part (D) of FIG. 6, an assembly comprises at least first and second parts 20, 22 that are held assembled by at least one connection element 24.

The first part 20 comprises a first face 20.1 facing towards the second part 22, a second face 20.2 facing away from the first face 20.1 and a through-orifice 20.3, one for each connection element 24, opening onto the first and second faces 20.1, 20.2. The second part 22 comprises a first face 22.1 facing towards the first part 20, a second face 22.2 facing away from the first face 22.1 and a through-orifice 22.3, one for each connection element 24, opening onto the first and second faces 22.1, 22.2.

Each connection element 24 comprises a first abutment 24.1 that is pressed against the second face 20.2 of the first part 20, a second abutment 24.2 that is pressed against the second face 22.2 of the second part 22, and a shank 24.3 which connects the first and second abutments 24.1, 24.2 and is accommodated in the through-orifices 20.3, 22.3 of the first and second parts 20, 22. According to one design, the connection element 24 is a bolt, the first abutment 24.1 corresponding to the head of the screw of the bolt, the shank 24.3 corresponding to the threaded shank of the screw and the second abutment 24.2 corresponding to the nut of the bolt. Of course, the invention is not restricted to this design for the connection elements 24. By way of example, the connection element 24 may be a rivet.

In terms of dimensions, for a given connection element 24, the through-orifice 20.3 of the first part 20, which accommodates the shank 24.3 of the connection element 24, has a first internal diameter D1. The through-orifice 22.3 of the second part 22, accommodating the shank 24.3 of the connection element 24, has a second internal diameter D2 substantially equal to the first diameter D1. The shank 24.3 of the connection element 24 has an external diameter D24 smaller than the first and second internal diameters D1, D2.

For at least one of the connection elements 24, the assembly comprises a spacer washer 26 positioned between the first and second parts 20, 22 and around the shank 24.3 of the connection element 24. According to one design, the assembly comprises a spacer washer 26 for each connection element 24. The spacer washer 26 has a first face F1 facing towards the first part 20 in operation, and a second face F2 that is parallel to the first face F1 and faces towards the second part 22 in operation.

In terms of dimensions, the spacer washer 26 has a washer thickness (distance between the first and second faces F1, F2) of the order of several tenths of a millimeter to several millimeters. It comprises a through-hole 26.1 which has an internal diameter Di26 greater than the external diameter D24 of the shank 24.3 of the connection element 24, approximately equal to the first or second internal diameter D1, D2 of the through-orifice 20.3, 22.3 of the first or second part 20, 22. The spacer washer 26 comprises a perimeter 26.2 having at least one dimension greater than the internal diameters D1, D2 of the through-orifices 20.3, 22.3 of the first and second parts 20, 22.

According to one design, the perimeter 26.2 of the spacer washer 26 is circular and has an external diameter De26 greater than the internal diameters D1, D2 of the through-orifices 20.3, 22.3 of the first and second parts 20, 22. Of course, the invention is not restricted to this form for the perimeter 26.2.

According to one embodiment, at least one of the first and second faces F1, F2 of the spacer washer 26 has a high coefficient of friction. Preferably, both of the faces F1, F2 have high coefficients of friction. This embodiment makes it possible to improve the mechanical characteristics of the assembly, in particular in terms of shear strength.

According to one feature, each spacer washer 26 is obtained from a spacer element 28, shown in FIGS. 5 and 7, comprising a flat body 30 having a thickness equal to the washer thickness and a perimeter 30.1 identical to the perimeter 26.2 of the spacer washer 26. This spacer element 28 does not comprise a through-orifice.

When the spacer washer 26 has a circular perimeter 26.2, the body 30 is a disk having an external diameter D30 equal to the external diameter De26 of the spacer washer 26.

The body 30 of the spacer elements 28 has first and second faces which corresponds to the first and second faces F1, F2 of the spacer washer 26, and which have coefficients of friction identical to those desired for the spacer washer 26.

The body 30 of the spacer element 28 comprises a circular score line 32 whose diameter is equal to the internal diameter Di26 of the spacer washer 26.

This score line 32 delimits, to the outside, a spacer washer 26 and, to the inside, a disk 34.

This score line 32 is designed to maintain the spacer washer 26 and the disk 34 connected to one another so long as a separation force exerted on the spacer washer 26 and/or the disk 34 is below a given threshold, and to break and obtain separation of the spacer washer 26 and the disk 34 when the separation force is above the given threshold. The latter is determined in such a way that the disk 34 detaches from the spacer washer 26 when the shank 24.3 of a connection element 24 is inserted into the through-orifices 20.3, 22.3 of the first and second parts 10, 12.

According to one embodiment, the score line 32 is created by machining a circular groove using a hole saw over a certain thickness of the body 30 of the spacer element 28.

According to another embodiment, the score line 32 is created using a circular notched hole punch 36, as illustrated in FIG. 7, serving to obtain discontinuous cuts along the score line 32. In this case, the score line 32 comprises a succession of cuts passing through the body 30.

Of course, the invention is not limited to these embodiments to obtain the score line 32.

The body 30 of the spacer element 28 may be of metal or of composite material.

As illustrated in FIGS. 5 to 7, the spacer element 28 comprises a centering pad 38 positioned on one of the faces of the body 30, secured to the latter and centered with respect to the score line 32.

This centering pad 38 is cylindrical and has a cylindrical lateral wall 38.1 and two planar end faces 38.2, 38.3 that are substantially perpendicular to the axis of the lateral wall 38.1, one of the end faces 38.2 being pressed against one of the faces of the body 30 of the spacer element 28.

According to one design, the centering pad 38 and the body 30 are connected by a permanent connection, such as by adhesive bonding.

According to another design, thus centering pad 38 and the body 30 are connected by a non-permanent connection, for example by using a repositionable adhesive or self-gripping strips, by means of which it is possible to detach the centering pad 38 from the rest of the body 30, in particular when the score line 32 is broken. This design makes it possible to reuse the centering pad 38.

According to one embodiment, the centering pad 38 is made of composite material or plastic material. It may be created by three-dimensional printing or by molding. Of course, the invention is not limited to these materials or these manufacturing methods.

This centering pad 38 has a height (distance between the end faces 38.2, 38.3) of the order of several millimeters to several centimeters.

This centering pad 38 is designed to center the score line 32 with respect to the through-orifices 20.3, 22.3 of the first and second parts 20, 22 by being inserted into one of the through-orifices 20.3, 22.3.

According to one embodiment, shown in FIG. 5, the centering pad 38 has an external diameter D38 equal to the internal diameter D1 of the through-orifice 20.3 in which it is to be positioned.

According to another embodiment, shown in FIG. 7, the centering pad 38 has an external diameter D38 smaller than the internal diameter D1 of the through-orifice 20.3 in which it is to be positioned. It is lateral wall 38.1 has a peripheral channel 40 that is spaced apart from the end faces 38.2, 38.3. In addition, the spacer elements 28 comprises an elastic ring 42 that is designed to surround the centering pad 38 and be accommodated in the peripheral channel 40. This elastic ring 42 has an internal diameter that is smaller than the external diameter D38 of the centering pad 38, and an external diameter that is equal to or slightly greater than the internal diameter D1 of the through-orifice 20.3 in which the centering pad 38 is to be positioned.

This elastic ring 42 is designed to be able to be compressed between the centering pad 38, more particularly the bottom of the peripheral channel 40, and the wall of the through-orifice 20.3 in which the centering pad 38 is to be positioned.

According to one abutment, the elastic ring 42 is an O-ring.

The operating principle is described with reference to FIGS. 6A-6D.

As illustrated in FIG. 6A, the assembly method comprises the step of positioning at least one intact spacer element 28, the score line 32 having not been broken, at a through-orifice 20.3 of the first part 20 which is to accommodate the shank 24.3 of a connection element 24. For each spacer element 28, the centering pad 38 is positioned in the through-orifice 20.3 so as to be centered, and the body 30 is pressed against the first face 20.1 of the first part 20.

Next, as illustrated in FIG. 6B, the assembly method comprises a step of positioning the first and second parts 20, 22 with respect to one another by aligning the through-orifices 20.3, 22.3 of the first and second parts 20, 22, the body 30 of each spacer element 28 being positioned between the parts 20, 22.

As illustrated in FIG. 6C, the assembly method comprises a step of inserting the shanks 24.3 of the connection elements 24 into the through-orifices 20.3 of the first part 20 from the second face 20.2. During this step of inserting the shanks 24.3, the score line 32 of each a spacer element 28 breaks, allowing the shank 24.3 to pass through the parts 20, 22. Thus, the disk 34 and the centering pad 38 of each spacer element 28 are ejected outside of the through-orifice 22.3 of the second part 22. Only one part of the spacer elements 28 is retained between the parts 20, 22 and forms a spacer washer 26.

Since the stem 24.3 of each connection element projects from the second face 22.2 of the second part 22, the assembly method comprises a step of tightening the connection elements 24, by placing the second abutment 24.2 of each connection element 24, for example the nut, so as to hold the first and second parts 20, 22 pressed against the spacer washers 26, as illustrated in FIG. 6D.

The centering pad 38 makes it possible to hold the spacer element 28 in position while the parts 10, 12 of the assembly are being positioned with respect to one another.

In contrast with the centering rings 18 of the spacer washers 16 of the prior art, no detachable element interferes with the shanks 24.3 of the connection elements 24.

Finally, the play between the shank of the connection elements and the parts that are to be assembled can be reduced insofar as it is not necessary, as is the case for the prior art, to provide a space between the shank of the connection element and at least one of the parts in order to accommodate a centering ring of a spacer washer.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A spacer element serving to obtain a spacer washer comprising:
    a first face,
    a second face,
    a thickness,
    a perimeter, and
    a through-hole having an internal diameter,
    said spacer washer being configured to be positioned between first and second parts of an assembly, said first and second parts comprising through-orifices having internal diameters configured to accommodate a shank of a connection element;
    wherein the spacer element comprises:
        a body having first and second faces corresponding to the first and second faces of the spacer washer that is to be obtained, a thickness and a perimeter that are identical to those of the spacer washer that is to be obtained, said body comprising a circular score line whose diameter is equal to the internal diameter of the spacer washer that is to be obtained, the score line defining a removable disk, the disk having a first surface aligned with the first face of the spacer washer and a second surface aligned with the second face of the space washer,
        a centering pad positioned on either the first or second face of the body, being secured to the body and centered with respect to the score line,
        the score line being configured to break when the shank of a connection element is inserted into the through-orifices of the first and second parts in one of which the centering pad is positioned.

2. The spacer element as claimed in claim 1, wherein the centering pad and the body are connected by a non-permanent connection, allowing the centering pad to be detached from a disk of the body when the score line is broken.

3. The spacer element as claimed in claim 1, wherein the centering pad and the body are connected by a permanent connection.

4. The spacer element as claimed in claim 1, wherein the centering pad is cylindrical and has an external diameter equal to the internal diameter of the through-orifice in which the centering pad is to be positioned.

5. The spacer element as claimed in claim 1, wherein the score line comprises a succession of cuts passing through the body.

6. A spacer element serving to obtain a spacer washer comprising:
    a first face,
    a second face,
    a thickness,
    a perimeter, and
    a through-hole having an internal diameter,
    said spacer washer being configured to be positioned between first and second parts of an assembly, said first and second parts comprising through-orifices having internal diameters configured to accommodate a shank of a connection element;
    wherein the spacer element comprises:
        a body having first and second faces corresponding to the first and second faces of the spacer washer that is to be obtained, a thickness and a perimeter that are identical to those of the spacer washer that is to be obtained, said body comprising a circular score line whose diameter is equal to the internal diameter of the spacer washer that is to be obtained,
        a centering pad positioned on either the first or second face of the body, being secured to the body and centered with respect to the score line,
    the score line being configured to break when the shank of a connection element is inserted into the through-orifices of the first and second parts in one of which the centering pad is positioned,
        wherein the centering pad is cylindrical and has an external diameter smaller than the internal diameter of the through-orifice in which the centering pad is to be positioned, and
        wherein the spacer element comprises an elastic ring having an internal diameter smaller than the external diameter of the centering pad and an external diameter equal to or slightly greater than the internal diameter of the through-orifice in which the centering pad is to be positioned, said elastic ring being positioned around the centering pad and designed to be able to be compressed between the centering pad and the through-orifice in which the centering pad is to be positioned.

7. The spacer element as claimed in claim 6, wherein the centering pad has a cylindrical lateral wall, two end faces of which one is pressed against one of the faces of the body, and a peripheral channel provided on the lateral wall, spaced apart from the end faces and configured to accommodate the elastic ring.

8. A method for assembling at least two parts that are held assembled by at least one connection element, said connection element comprising a first and a second abutment and a shank connecting said first and second abutment, the at least two parts to be assembled each comprising, for each connection element, a through-orifice configured to accommodate the shank of the connection element, wherein the method comprises:
    positioning at least one spacer element by inserting and centering the centering pad into one of the through-orifices that are configured to receive a connection element,
    positioning the parts that are to be assembled, the body of each spacer element being positioned between the parts, inserting the shank of a connection element into the through-orifice in which the centering pad of the spacer element is positioned, during which step the score line breaks, allowing the shank to pass through the parts, a portion of the spacer element being retained between the parts and forming a spacer washer, tightening each connection element wherein the at least one spacer element comprises:

a body having first and second faces corresponding to the first and second faces of the spacer washer that is to be obtained, a thickness and a perimeter that are identical to those of the spacer washer that is to be obtained, said body comprising a circular score line whose diameter is equal to the internal diameter of the spacer washer that is to be obtained, a centering pad positioned on either the first or second face of the body, being secured to the body and centered with respect to the score line, the score line being configured to break when the shank of a connection element is inserted into the through-orifices of the first and second parts in one of which the centering pad is positioned.

\* \* \* \* \*